July 18, 1967  E. L. MUELLING  3,331,619
TOW BAR

Filed Nov. 21, 1966                                      2 Sheets-Sheet 1

INVENTOR.
EARL L. MUELLING
BY
Braddock & Burd
ATTORNEYS

July 18, 1967     E. L. MUELLING     3,331,619
TOW BAR
Filed Nov. 21, 1966     2 Sheets-Sheet 2
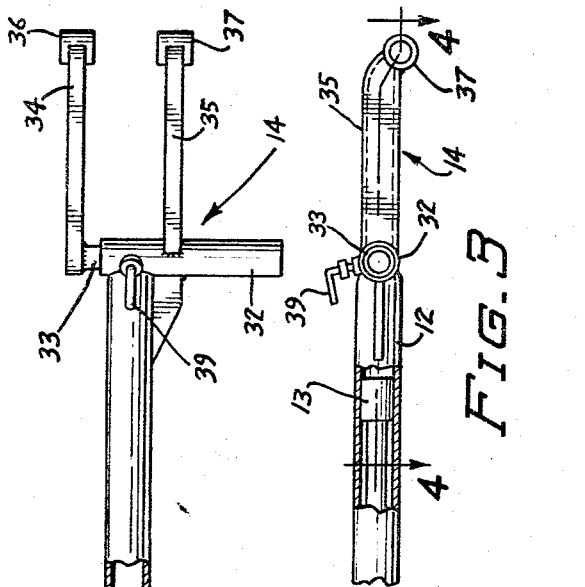
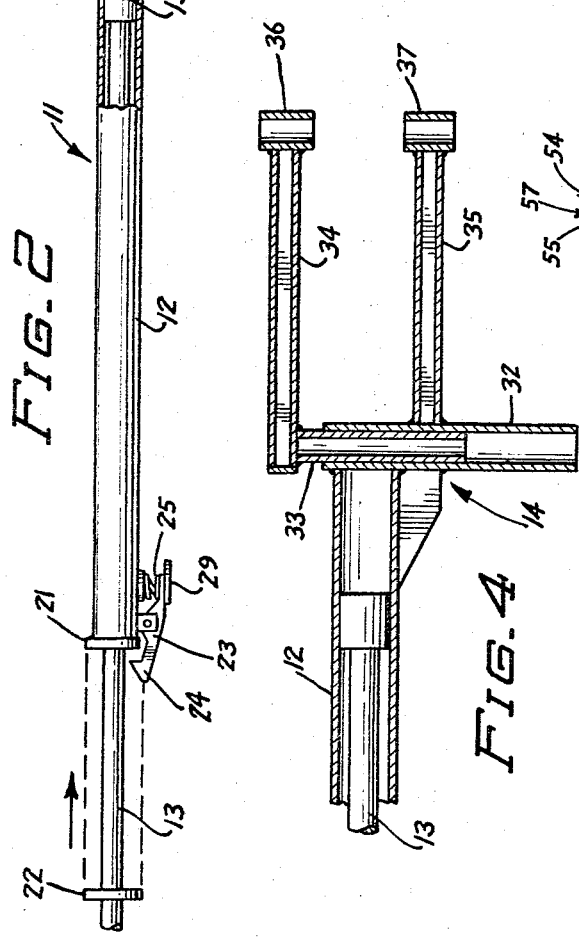
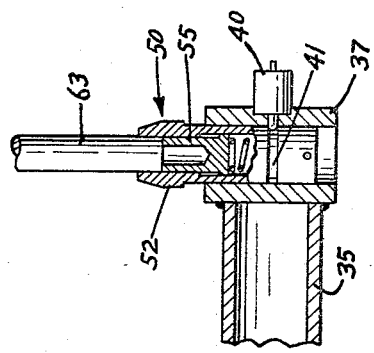
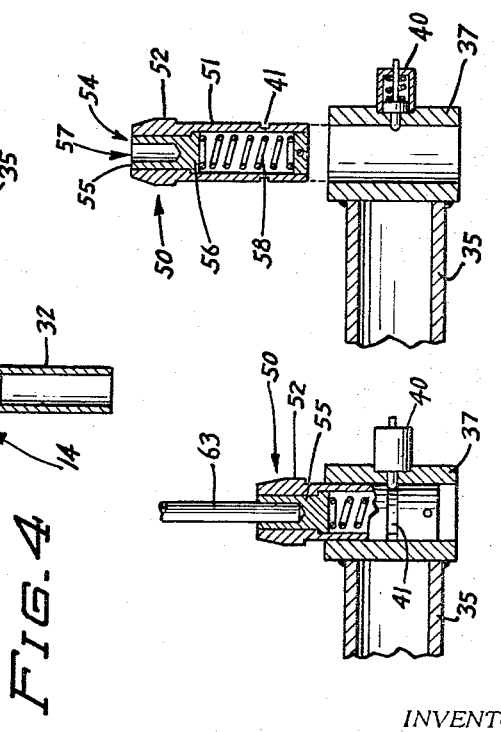
INVENTOR.
EARL L. MUELLING
BY
Braddock + Burd
ATTORNEYS United States Patent Office 3,331,619
Patented July 18, 1967

3,331,619
TOW BAR
Earl L. Muelling, Green Isle, Minn. 55338
Filed Nov. 21, 1966, Ser. No. 595,941
6 Claims. (Cl. 280—460)

ABSTRACT OF THE DISCLOSURE

Disclosed herein is a telescoping tow bar including a unique coupling member having relatively movable parts for coupling to various sized hitches. Also disclosed are coupling adapters which enable the coupling member to be used with hitches having either tubular or extending connection points. The coupling adapters adapt to various kinds and sizes of hitches.

---

This is a continuation-in-part of my co-pending application, Tow Bar, Ser. No. 450,469, filed Apr. 23, 1965.

This invention is concerned with towing apparatus, and more particularly with an improved telescoping tow bar connecter capable of facilitating easier connection of the tow bar between a towing device and body to be towed.

There are numerous tow bars presently in use. When the body to be towed is substantial, these prior art tow bars are often quite heavy and cumbersome to handle individually. It is often necessary to have two men to attach the tow bar between the towing vehicle and the body to be towed. After coupling one end of the tow bar to the body, due to the inflexibility and length of prior art tow bars it is often necessary to have one individual move the towing vehicle while another individual holds the tow bar for coupling to the vehicle.

The telescopic feature of the tow bar of this invention enables one individual to drive the towing vehicle to within an approximate distance of the body to be towed. The individual may then attach one end of the tow bar to the body to be towed, using the unique coupling apparatus of this invention, and then extend the tow bar to the proper distance for the other end to be coupled with the vehicle.

A lock feature of the tow bar enables the individual to move the vehicle to telescope the tow bar in until the lock mechanism catches to prevent further telescoping of the bar. The vehicle may then tow the body as with any known tow bar.

In this invention the telescoping tow bar is combined with a coupling means especially suitable for towing bodies which have built-in tubular hitch means for connection to a tow bar, such as the tube means commonly found in the nose wheel gear of an aircraft. Also, as part of the tow bar of this invention, there are shown special coupling adapters for use with the unique coupling means of this invention to adapt a coupling means to connection to various types and sizes of hitch means, whether tubular or extending.

In the drawings:

FIGURE 2 is a top view of the telescoping tow bar of this invention showing a cut-away view of the telescoping member within the outer member, and showing the locking means and the coupling means for connection to the body to be towed;

FIGURE 3 is a side view of the coupling means of the tow bar as shown in FIGURE 2;

FIGURE 4 is a sectional view of the drawing of FIGURE 3 taken along the line 4—4 showing the coupling means;

FIGURE 5 is a sectional drawing of a portion of the coupling means of the tow bar of this invention and a coupling adapter of this invention adapted to be used with the coupling means;

FIGURE 6 is another view of the coupling adapter connected to a portion of the coupling means of the tow bar of this invention, showing the coupling adapter as connected to one type of extending hitch means;

FIGURE 6a is a view similar to FIGURE 6 showing the coupling adapter connected to another type of extending hitch means;

Figure 1:
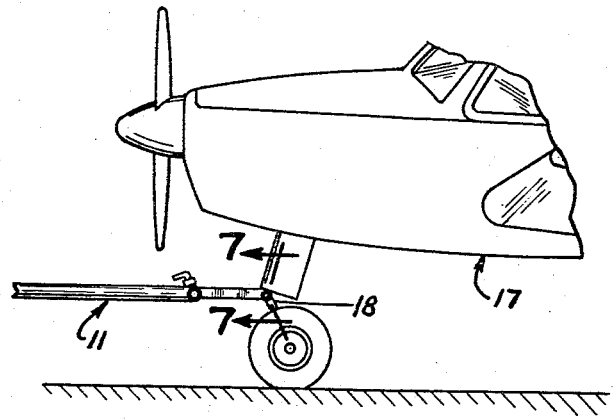
FIGURE 1 is a view showing the tow bar of this invention with the unique coupling means connected to the nose wheel of a body to be towed.
Figure 7:
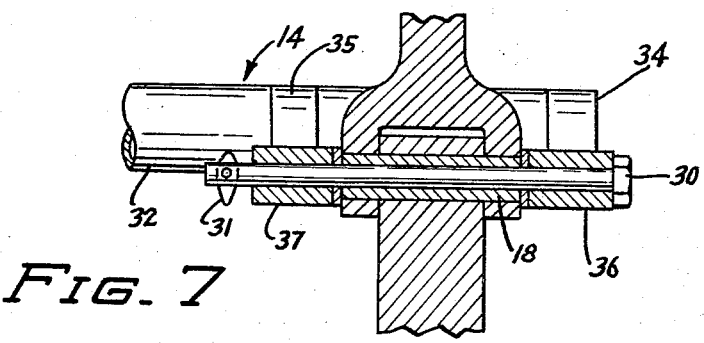
Figure 8:
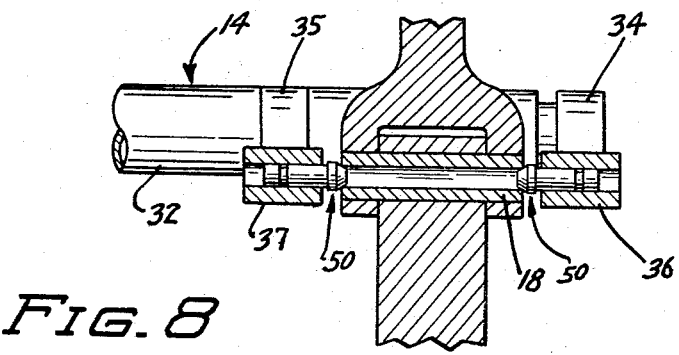

FIGURE 7 is a sectional view of FIGURE 1 taken along the line 7—7 showing a first embodiment of the coupling means of this invention as used with a tubular hitch means; and FIGURE 8 is a sectional view similar to that of FIGURE 7 but showing a second embodiment of the coupling means of this invention as connected to a tubular hitch means, this second embodiment using the coupling adapters of this invention.

In FIGURE 1 there is shown a portion of the tow bar of this invention, indicated generally at 11, connected to a body to be towed 17, here shown as an aircraft. A coupling means 14 is connected to a towing hitch 18 on body 17.

In FIGURE 2, tow bar 11 is shown in its entirely. Here it can be seen that tow bar 11 includes an outer member 12 connected to coupling device 14. A telescoping member 13 is adapted to be connected to another coupling means (not shown) intended to be connected to the towing device. There is also shown a flange 21 on member 12 and a flange 22 on member 13. Flanges 21 and 22, in combination with a latch 23 mounted on member 12, provide the lock mechanism to prevent telescoping of the tow bar.

A cut-away portion of FIGURE 2 shows telescoping member 13 within member 12. There is also shown latch 23 having a hook 24 at one end, in association with a beveled edge 27. At the other end of latch 23 is a release button 29 biased away from member 12 by a spring 25.

In FIGURES 2, 3 and 4 it can be seen that coupling means 14 comprises: a tubular member 32 connected at right angles to member 12; a leg 33 connected at right angles to an arm 34, leg 33 adapted to slide within tube 32; another arm 35 connected to tube 32 and extending substantially parallel to arm 34; and a pair of shorter tubes 36 and 37 connected, respectively, at right angles to arms 34 and 35.

In FIGURES 2 and 3 there can also be seen a lock mechanism for coupling means 14 which comprises a bolt 39 which may be extended through tube 32 to hold leg 33 at the desired position within tube 32.

FIGURES 5, 6 and 6a disclose a coupling adapter 50, having a substantially cylindrical stem 51 and an ogival head portion 52. A cavity 54 is formed within coupling adapter 50 and extends outwardly through stem 51 and head 52. Within cavity 54 is mounted a spring member 58 and a body 55. Body 55 has formed therein another cavity 57. It can also be seen that cavity 54 has a posterior portion of greater diameter than an anterior portion. A flange 56 on body 55 has a diameter greater than the anterior portion of cavity 54. Thus, as spring 58 urges body 55 outwardly through cavity 54, flange 56 prevents body 55 from being urged out of cavity 54. A groove 41 in stem 51 is adapted to mate with a spring detent member 40 to hold coupling adapter 50 within tubular member 37. In operation, coupling adapters 50 may be placed in both tubular members 36 and 37, such that head 52 on the pair of coupling adapters are in facing relation.

In FIGURE 6 coupling adapter 50 is shown held in position in tube member 37 by the cooperation of groove 41 and spring detent 40. Here body 55 is shown depressed within cavity 54 by an extending hitch member 63. The depression of body 55 causing hitch 63 to extend into head 52, so that adapter 50 firmly grasps hitch 63 preparatory to towing. In FIGURE 6a, hitch member 63 is shown having a narrower extending portion which extends directly into cavity 57.

FIGURE 7 shows coupling means 14 connected to tow hitch 18, here shown as a tubular device. A bolt 30 is shown passing through tubular members 36 and 37 connected to coupling means 14 by arms 34 and 35, respectively. Bolt 30 passes through hitch 18 between members 36 and 37. Bolt 30 is shown fastened in place by fastener 31.

FIGURE 8 shows the same connection as that of FIGURE 7, but this time accomplished with a pair of the coupling adapters 50 instead of bolt 30. In FIGURE 8 the inside diameter of tubular hitch 18 is shown to be such that the tapered portion of ogival head 52 of adapter 50 extends partially into each side of hitch 18, preparatory to towing. Head 52 can be firmly held in place by tightly locking bolt 39 through tube 32 against leg 33.

To use the tow bar of this invention the individual first parks the device to do the towing at an approximate distance from the body to be towed 17. The individual then leaves the towing device and proceeds to attach coupling means 14 to tubular hitch 18 on the body to be towed such as aircraft 17. Operation of coupling means 14 is best understood by reference to FIGURES 4, 7 and 8. As seen in FIGURE 4, leg 33 is adapted to slide in tube 32 to thus widen the gap between tubes 36 and 37 so that they may be adapted to fit across various lengths of hitches 18 on various bodies to be towed. After tubes 36 and 37 have been properly positioned, they are placed one on each end of hitch 18. In the case of a tubular hitch 18, bolt 30 is slid through tube 36, hitch 18 and tube 37, in that order. Fastener 31 on bolt 30 is then positioned to prevent bolt 30 from falling out. Or, in the alternative, adapters 50 will have previously been placed in each of members 36 and 37, and after proper extension of leg 33 within tube 32, adapters 50 may be pushed together to contact hitch 18. Whichever embodiment is used, leg 33 may be firmly fastened in tube 32 to hold arms 34 and 35, and thus tubes 36 and 37, in a single spaced relation. This is accomplished by tightening bolt 39, through an aperture in tube 32, to a forced fit contact with leg 33. It should be understood that there are many methods available for locking tube 33 within tube 32, and bolt 39 is merely a preferred embodiment shown here without intention to so limit this invention.

If hitch 18 is not a tubular member, but rather an extending member, such as 63 of FIGURE 6, coupling adapters 50 may be used. When extending member 63 is smaller than the diameter of cavity 54 but greater than the diameter of cavity 57, proper connection results in body 55 being forced against spring 58 into cavity 54. Thus the head 52 of adapter 50 firmly holds extending member 63. Since this will be the case on each side of hitch 18, a firm towing connection is accomplished. If extending member 63 is of a diameter smaller than cavity 57, it will slide into cavity 57 and be held for towing in that manner, as shown in FIGURE 6a.

Once coupling means 14 has been connected by any of the above described manners to hitch 18 on a body to be towed such as aircraft 17, the individual can pick up the other end of tow bar 11 and telescope out member 13 from within member 12 so that a couple (not shown) attached to member 13 can be connected to the towing device. Tow bar 11 will now be in an attached and unlocked position.

Prior to towing, the individual can lock tow bar 11 by moving the towing device toward the body to be towed 17, such that member 13 telescopes into member 12. As member 13 telescopes in, flange 22 will move toward flange 21. Prior to meeting flange 21, flange 22 will hit beveled edge 27 on latch 23. The action of flange 22 riding against beveled edge 27 will cause hook 24 to be raised, so that flange 22 may pass to and against flange 21. At the same time hook 24 is raised, spring 25 will be depressed. The alignment of parts is such that at the point at which flange 22 abuts against flange 21, flange 22 will be past hook 24. Therefore, at the time of the abutment of the flanges 21 and 22, hook 24 will be free to drop toward member 13, due to the biasing of spring 25. This will result in a locking of telescoping member 13 in member 12 by latch 23 holding flange 22 against flange 21. Tow bar 11 is now in the advance and locked position.

When the body to be towed 17 has been towed to the desired location, the individual removes coupling 14 and the coupling to the towing device, and proceeds to tow another body. To release the lock tow bar 11, it is only necessary for the individual to push release button 29, thus causing latch 23 to pivot, which will raise hook 24 and allow member 13 to be telescoped outward.

Although the operation of the apparatus of this invention has been described in connection with an aircraft, due to the common usage of tubular towing hitches in nose wheel gear of aircraft, it is apparent that many types of bodies can be towed with this tow bar, and there is no intention to limit the scope of this invention to aircraft. Further, it is apparent that coupling means 14, in the various embodiments described, can also be used with other tow bars than that described in this invention.

The apparatus described above presents a novel combination of a tow bar and a unique coupling means, which offer advantages as to ease of connection between a towing vehicle and the body to be towed, which advantages are not found in prior art apparatus of this type.

The embodiments of the invention in which an exclusive property or privilege is claimed are defined as follows:

1. In a tow bar including coupling means for connecting to a body to be towed, the body having means for connection to a towing device, the improved coupling means comprising: a tube rigidly mounted on the tow bar and having its longitudinal axis substantially perpendicular to the longitudinal axis of the tow bar; a first member rigidly mounted on said first tube and extending perpendicular to said first tube longitudinal axis; a second member having first and second legs perpendicular to one another, said first leg slidably mounted in said tube, and said second leg extending parallel to said first member in spaced relation; said first member and said second leg each defining an aperture, said apertures being in axial alignment; engaging means, said engaging means adapted to be inserted into said apertures and to engage the means for connection to a towing device on the body to be towed, to couple the coupling means to the body; and lock means for firmly holding said slidably mounted first leg within said tube.

2. The tow bar with improved coupling means as described in claim 1 in which the tow bar comprises: a first means connected at one end to the coupling means; a second means telescopically mounted within said first means and connected at one end to further coupling means for connection to a towing device; and lock means including engageable first and second parts, said first and second parts mounted, respectively, on said first and second means and adapted to engage to prevent further telescoping of said second means in said first means.

3. The improved coupling means of claim 1 in which the means for connection to a towing device on the body to be towed includes tube means, and in which said engaging means comprises: bolt means including fastening means, said bolt means adapted to be inserted through said apertures and the tube means on the body to be towed, and fastened therethrough to couple the coupling means to the body.

4. The improved coupling means of claim 1 in which said engaging means comprise: first and second coupling adapters each having an elongated cylindrical stem and an enlarged head portion including a tapered anterior portion, said stem and head portion defining a cavity opening outwardly through said anterior portion; a further member in each said coupling adapter spring mounted in said cavity and yieldingly biased outwardly through said anterior portion, said further member defining a second cavity opening outwardly through said anterior portion; and means for connecting said stems in said apertures of the improved coupling means such that said head portions are in substantially aligned opposing spaced relation, for engagement with any one of a variety of the means for connection to a towing device on the body to be towed.

5. In a tow bar coupling device including a pair of relatively movable tubular members in which coupling means are adapted to be mounted, the improved coupling means for connection to any one of a variety of means for connection on a body to be towed comprising: a body including means for mounting said body in the tubular members; a head mounted on said body, said head having an ogival anterior portion; said body and said head defining a first cavity opening outwardly through said anterior portion; and a second body spring mounted in said first cavity and yieldingly biased toward said anterior portion, said second body defining a second cavity opening outwardly through said anterior portion.

6. The improved coupling means of claim 5 in which said first cavity has a posterior portion of greater diameter than an anterior portion; and said second body includes a posterior flange of greater diameter than said first cavity anterior portion, for locking said spring mounted second body in said first cavity.

References Cited
UNITED STATES PATENTS

| | | | |
|---|---|---|---|
| 1,880,075 | 9/1932 | Davis | 280—116 |
| 2,287,955 | 6/1942 | Zunino. | |
| 2,846,018 | 8/1958 | Puckett. | |
| 2,943,867 | 7/1960 | Hartel | 280—493 X |
| 3,004,773 | 10/1961 | Ankeney | 280—503 X |
| 3,014,738 | 12/1961 | Kasten | 280—482 |

LEO FRIAGLIA, *Primary Examiner.*